July 18, 1950  G. A. COLLENDER  2,515,986
CLUTCH
Original Filed Nov. 23, 1945  2 Sheets-Sheet 1

Inventor
Gustave A. Collender
By Ralph L. Stevens
Attorney

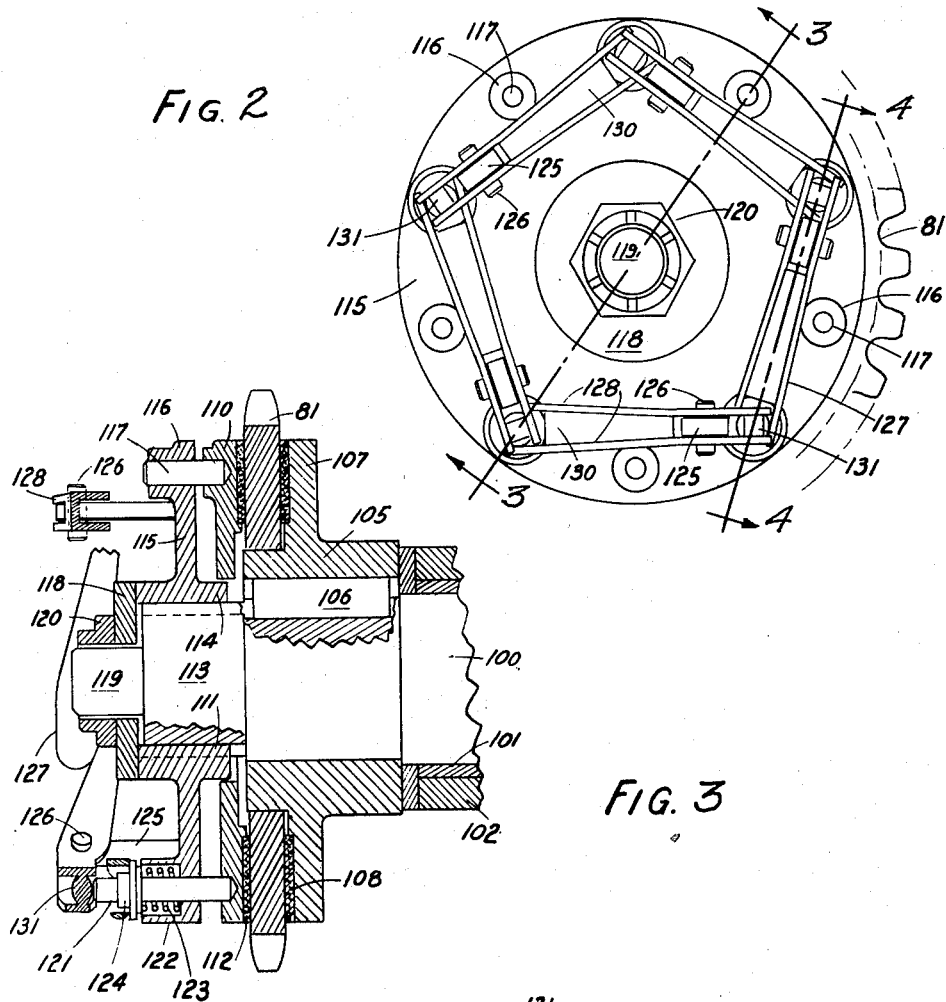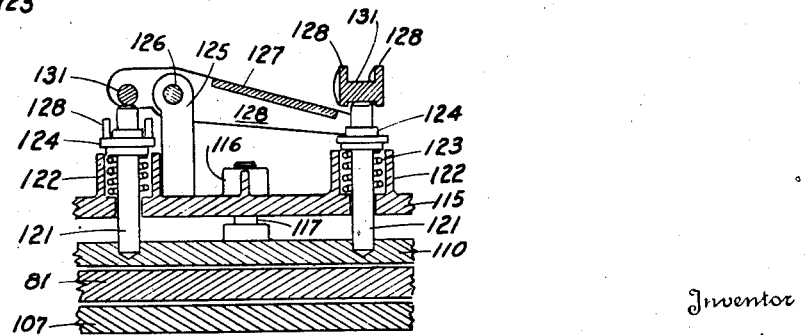

Patented July 18, 1950

2,515,986

UNITED STATES PATENT OFFICE 2,515,986

CLUTCH

Gustave A. Collender, Los Angeles, Calif., assignor to Six Wheels, Inc., Los Angeles, Calif., a corporation of California Original application November 23, 1945, Serial No. 630,286. Divided and this application April 21, 1947, Serial No. 742,921

8 Claims. (Cl. 64—30)

This invention relates to friction clutches of the slipping type. It relates more particularly to automatic mechanisms, that might better be termed clutches of the self-operating or overload type.

The present application is a division of my copending application, Serial No. 630,286, filed November 23, 1945, which discloses a complete apparatus in which this invention may be usefully incorporated.

It is the primary object of this invention to devise a new and improved friction drive mechanism that is sturdy in construction and reliable and sensitive in operation.

The present invention further includes the object of providing a conveniently accessible and accurately adjustable device for varying the load that can be transmitted through a friction drive mechanism.

Another important object of my invention resides in the provision, in devices of the character above mentioned, of a chain of spring-actuated levers for multiplying and uniformly transmitting the spring reactions to a frictional coupling.

It is a further object to construct an improved transmission shaft arrangement with dual power takeoff units that are differentially rotatable due to incorporation of an automatic slipping clutch.

The foregoing and other objects of my invention should become clear from a study of the following detailed description when taken in conjunction with the accompanying drawings, wherein:

Fig. 2 is an enlarged view looking axially towards the left hand end of Fig. 1.

Fig. 3 is a fragmentary sectional view taken substantially upon the plane of line 3—3, Fig. 2.

Fig. 4 is another fragmentary detailed section taken along the plane of line 4—4, Fig. 2.

Figure 1:
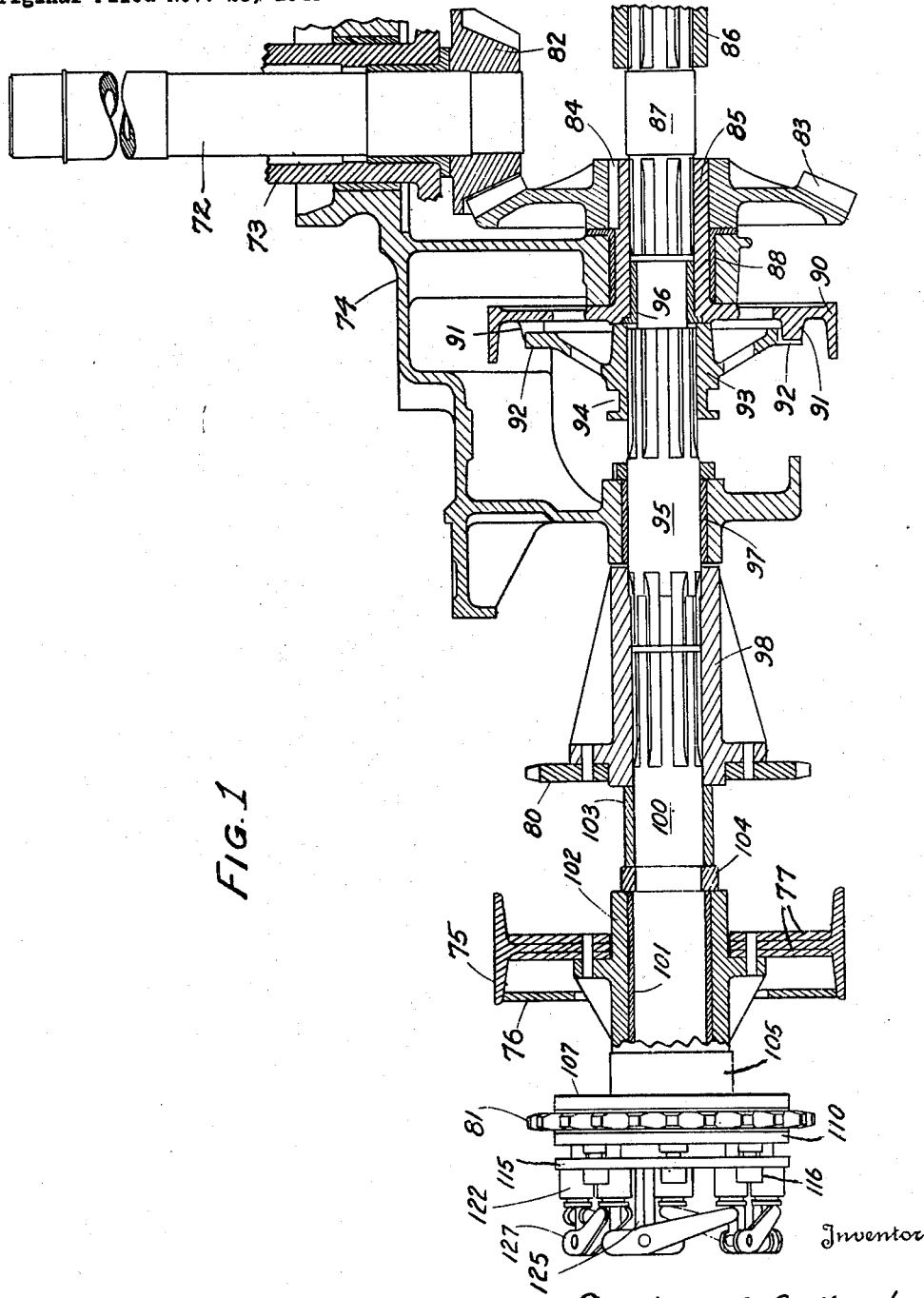
Fig. 1 represents a cross section, taken vertically and axially of a vehicle jackshaft assembly embodying the present invention.

With continued reference to the drawings, Fig. 1 shows slightly more than one half of a framework and jackshaft assembly copied, for convenience of illustration, from the drawings of the aforementioned copending application wherein it forms part of a crane undercarriage. It embodies a vertical propeller shaft 72 journaled in a sleeve 73 which in turn is journaled in a crane bull wheel 74. Laterally outwardly from the bull wheel the support for the jackshaft mechanism is completed by one of the longitudinal side frame members of the vehicle chassis comprising an I-beam 75 reenforced by plates 76 and 77.

The purpose of the disclosed arrangement is to differentially drive a pair of sprocket plates (or gears) 80, 81; or, rather, to frictionally drive the plate 81 so that slipping may occur if it becomes overloaded. Chains or other suitable means may be used to transmit power from the plates to a pair of driven units (not shown). The illustrated mechanism for coupling the propeller shaft 72 to the plates 80 and 81 is constructed as follows:

A pinion 82 is secured to the lower end of the propeller shaft 72, and meshes with a bevel gear 83 that is keyed at 84 to a sleeve 85 to rotate the latter. A similar sleeve 86 is disposed at the other side of the central plane, but there is no second bevel gear to drive it since it receives its torque through a splined connection with a short shaft 87 which is in splined coupling with the sleeve 85. In all other respects the jackshaft housing assembly partially shown in Fig. 1 is identical at opposite sides of the vertical longitudinal plane that passes through the axis of the propeller shaft 72.

The sleeves 85 and 86 have frame-supported bearings 88, and have integral radial spiders 90 equipped with rings of clutch dogs 91 that face laterally outwardly. These dogs on each spider are complemental to a plurality of spaced fingers 92 formed upon and extending radially from a hub 93 that has a peripheral groove 94 for coaction with a conventional clutching and declutching fork (not shown). The hub 93 is slidably splined upon a shaft 95 that is rotatable in frame-supported bearings 96 and 97. Each hub 93 may be selectively moved into and out of locking engagement with its adjacent spider 90 by any suitable arrangement of servo-motors and forks such, for example, as disclosed in my copending application, Serial No. 567,330, filed December 9, 1944, now abandoned.

Each sprocket plate 80 is bolted to a heavy sleeve 98 that is in splined connection at one end with its adjacent shaft 95, and that is similarly connected at its other end to a shaft 100 to drive the latter. The shaft 100 has a bearing 101 in the region of the reenforced side frame member and projects outwardly therebeyond to drive the sprocket 81 through a differential mechanism about to be described. The bearing 101 is telescoped in a sleeve 102 that is bolted to the frame structure, as shown. The sleeves 98 and 102 are separated by spacers 103, 104. The shafts 95 and 100 could be made in one piece, but preferably are separate for maximum strength and for convenience of assembly.

With reference now chiefly to Figs. 2 to 4, each shaft 100 is surrounded near its outer end by a hub 105 that is keyed thereto at 106. The hub has a radial flange 107 disposed slightly inward from its outer end to form a cylindrical seat for the sprocket plate 81, relative rotation between these parts being possible. The flange is recessed to receive a flat annular ring 108 formed of clutch lining or any other suitable material that can be used satisfactorily in a friction clutch. A floated pressure plate 110 at the opposite face of the sprocket plate is likewise recessed to receive a similar clutch ring, 112.

Just outward of the plate 110, the shaft 100 has a reduced portion 113 surrounded by a sleeve 114 which is non-rotatable but slidable thereon by virtue of keys 111 which afford an axial slip fit. This sleeve has an integral radiating flange 115 which at its rim is provided with a plurality of spaced, outwardly facing bosses 116 which ride freely and slidably upon a corresponding number of pins 117 that are driven into tight fitting sockets in the plate 110, as shown. These pins 117, which serve to float the plate 110, preferably are five in number, as also are the pressure applying instrumentalities presently described, but the number may vary slightly.

The sleeve 114 is engaged by a large washer-like disc 118, which loosely surrounds a greatly reduced and threaded extremity 119 of the shaft 100; and this disc is retained and pressed against the sleeve by a nut 120, screwed onto the extremity 119. The nut is adjustable to vary the degree of frictional engagement between the facings 108, 112 and the sprocket plate 81, subject to modification and equalization of frictional resistances caused by other mechanism, as follows.

Interposed at points on radial lines between each adjoining pair of pins 117, there is a substantially longer pin 121 having one end standing in a recess in the plate 110, and its body slidably extending through the flange 115. The latter has a plurality of integral sockets 122, one surrounding each pin 121 concentrically and each housing a compression spring 123 which, when freely expanded, is of considerably greater length than its socket. A flanged bushing 124 is slipped onto the outer end of each pin 121 and can be forced inwardly to compress the adjacent spring 123. The means for urging these pins and springs inwardly and for balancing the applied forces is constructed as follows.

Adjacent each socket 122, the flange 115 has an integral post 125 of such length that it projects outwardly beyond the outer ends of the pins 121. These posts are five in number and equally spaced apart; and each has a flat sided head pierced laterally to carry a pin 126 upon which is pivotally mounted a lever 127 of such length that its ends bridge the space between the two most adjacent pins 121 in chordal fashion. Each lever preferably is formed of heavy sheet metal as by stamping or pressing to produce a pair of elongated spaced sidewalls 128, partially joined by an integral body plate 130. The sidewalls receive the ends of the pin 126, and at that end closer to the pivot they straddle and are welded to a small block 131 which freely contacts the outer end of an adjacent pin 121. The other ends of the sidewalls diverge somewhat and are lesser in width so that they may be projected under one of the blocks 131 to straddle the outer end of a pin 121 and slidably engage the outer side of that bushing 124 which surrounds said pin.

Thus there are five of the pressure applying and equalizing devices comprising the chordally arranged lever units 127, with one end of each reacting positively against the pressure plate 110 through a pin 121, and the other end acting upon said plate through a resilient compression spring 123. The action of each spring is multiplied about five times, as can be seen from the relative lengths of the arms into which each lever 127 is divided by its pivot pin 126. The forces thus exerted by the pins 121 upon the plate 110 are equalized and cause the plate to apply well balanced pressure against the friction rings 108, 112, so that there can be no localized or excessive wear of the latter.

The nut 120 affords ready adjustment to select a desired pressure and to compensate for wear. This nut could be replaced or augmented by means under constantly variable control of an operator to convert the automatic drive into a manual clutch.

The functioning of the apparatus and its sub-combinations should be clear from the foregoing running description. The invention resides chiefly or essentially in the friction drive unit seen in Figs. 2 to 4, wherein the forces exerted on the plate 81 are accurately equalized and constantly well balanced, and wherein adjustments can be made quickly and conveniently.

Obviously, numerous variations in design may be made without departing from the spirit of the invention and, therefore, I wish to be limited only by a reasonably liberal interpretation of the scope of the appended claims.

What is claimed is:

1. In a drive mechanism, a drive shaft a circular member surrounding said shaft and designed to be frictionally driven, and an axially movable pressure applying unit adjacent one side of said member, said unit comprising a plate frictionally engageable with said member, a second platelike element adjacent said plate, a plurality of pins slidable through said element and parallel to the operational axis of the mechanism, each pin having one end in abutment with said plate and its other end surrounded by a compressible resilient member, means on said shaft for holding said element in proper relationship to the other parts, and means mounted on said element for compressing said resilient members.

2. In the combination defined in claim 1, said pins being spaced apart circumferentially adjacent the perimeter of said platelike element, and said compressing means comprising a set of levers corresponding in number to said pins, said levers arranged in chordal fashion and pivotally connected between their ends to said platelike element, each lever having one end positively engaged with a pin and its other end engaged with the resilient member that surrounds the next adjacent pin of the series of the pins.

3. In a frictional drive mechanism, in subcombination, a pressure applying unit comprising a friction plate and a platelike element coaxially arranged in spaced and parallel relationship, said element having a plurality of apertures parallel to its axis and arranged radially outwardly therefrom in series, a corresponding number of pins extending freely through said apertures with their inner ends in engagement with said friction plate, compressible resilient units freely surrounding the outer ends of at least some of said pins, and a plurality of levers pivotally connected to said platelike element between their ends, each lever having one end engaged with one of said pins and its other end engaged with one of said resilient units.

4. In the mechanism defined in claim 3, the pivotal connections of said levers being considerably closer to their ends that engage the pins than to their ends that engage said resilient units.

5. In the mechanism described in claim 3, said pins having their inner ends anchored in said friction element, and said resilient units comprising metal compression springs.

6. In the mechanism set forth in claim 3, said pins arranged in a substantially circular series, and said levers arranged in chordal fashion to form a multi-sided ring.

7. In the mechanism of claim 3, said pins comprising five equally spaced elements adjacent the perimeter of said platelike element and each surrounded by one of said compression units, and said levers being five in number with each individually bridging the space between a pair of said spaced elements.

8. A slipping frictional clutch of the class described, comprising a rotatable shaft, a collar secured to said shaft to rotate therewith, a flat wheel rotatably surrounding said shaft and designed to be coupled to said collar for power transmission, a plate surrounding said shaft on the opposite side of said wheel from said collar, rings of frictional material carried by said collar and said plate to face the side surfaces of said wheel, and mechanism mounted upon said shaft to constantly force said plate towards said collar and thus tend to maintain a driving connection between said wheel and said shaft, said mechanism comprising a sleeve slidable on said shaft and having a radial flange adjacent said plate, a plurality of spaced pins slidable through said flange, compression springs surrounding said pins and confined by bushings slidably mounted on the free ends of said pins, a corresponding plurality of levers, each pivoted between its ends upon said flange and having its ends in contact, respectively, with the head of one pin and the bushing carried by an adjacent pin, and means mounted upon said shaft and engaging said sleeve positively limiting movement of said sleeve in a direction away from said plate.

GUSTAVE A. COLLENDER.

REFERENCES CITED

The following references are of record in the file of this patent:

UNITED STATES PATENTS

| Number | Name | Date |
| --- | --- | --- |
| 1,195,286 | Snyder | Aug. 22, 1916 |
| 1,355,537 | Chaloupka | Oct. 12, 1920 |
| 1,888,951 | Holland | Nov. 22, 1932 |
| 2,003,766 | Zwicky | June 4, 1935 |
| 2,117,486 | Lewellen et al. | May 17, 1938 |
| 2,292,210 | Santro et al. | Aug. 4, 1942 |
| 2,323,404 | Kuchar | July 6, 1943 |
| 2,333,553 | Potgieter et al. | Nov. 2, 1943 |